United States Patent
Zhang et al.

(10) Patent No.: US 12,062,781 B2
(45) Date of Patent: Aug. 13, 2024

(54) CATHODE MATERIAL AND ELECTROCHEMICAL DEVICE INCLUDING THE SAME

(71) Applicants: NINGDE AMPEREX TECHNOLOGY LIMITED, Ningde (CN); DONGGUAN AMPEREX TECHNOLOGY LIMITED, Dongguan (CN)

(72) Inventors: Yangyang Zhang, Ningde (CN); Gang Peng, Ningde (CN); Ye Lang, Ningde (CN); Wenyuan Liu, Ningde (CN)

(73) Assignees: NINGDE AMPEREX TECHNOLOGY LIMITED, Ningde (CN); DONGGUAN AMPEREX TECHNOLOGY LIMITED, Dongguan (CN)

( * ) Notice: Subject to any disclaimer, the term of this patent is extended or adjusted under 35 U.S.C. 154(b) by 929 days.

(21) Appl. No.: 16/970,555

(22) PCT Filed: Feb. 21, 2020

(86) PCT No.: PCT/CN2020/076112
§ 371 (c)(1),
(2) Date: Aug. 17, 2020

(87) PCT Pub. No.: WO2021/163987
PCT Pub. Date: Aug. 26, 2021

(65) Prior Publication Data
US 2023/0089526 A1  Mar. 23, 2023

(51) Int. Cl.
| | |
|---|---|
| *H01M 4/36* | (2006.01) |
| *H01M 4/505* | (2010.01) |
| *H01M 4/525* | (2010.01) |
| *H01M 4/02* | (2006.01) |
| *H01M 10/0525* | (2010.01) |

(52) U.S. Cl.
CPC .......... *H01M 4/366* (2013.01); *H01M 4/505* (2013.01); *H01M 4/525* (2013.01); *H01M 2004/021* (2013.01); *H01M 2004/028* (2013.01); *H01M 10/0525* (2013.01); *H01M 2220/20* (2013.01); *H01M 2220/30* (2013.01)

(58) Field of Classification Search
CPC ...... H01M 4/366; H01M 4/505; H01M 4/525; H01M 10/0525; H01M 2004/021; H01M 2004/028; H01M 2220/20; H01M 2220/30; H01M 4/131; H01M 4/1391; H01M 4/36; H01M 4/364; H01M 4/485; H01M 10/052; Y02E 60/10
See application file for complete search history.

(56) References Cited

U.S. PATENT DOCUMENTS

| | | | |
|---|---|---|---|
| 9,252,455 B1* | 2/2016 | Liu | H01M 10/052 |
| 2007/0059598 A1* | 3/2007 | Yang | H01M 4/485 |
| | | | 252/182.1 |
| 2007/0111044 A1* | 5/2007 | Chang | H01M 4/364 |
| | | | 429/231.95 |
| 2013/0089787 A1* | 4/2013 | Nagai | H01M 4/525 |
| | | | 429/231.1 |
| 2017/0194626 A1 | 7/2017 | Yamamura et al. | |
| 2018/0145324 A1* | 5/2018 | Liu | H01M 4/505 |
| 2018/0241043 A1 | 8/2018 | Miyatake et al. | |
| 2019/0252687 A1 | 8/2019 | Zheng | |
| 2019/0386294 A1 | 12/2019 | Han | |
| 2020/0083524 A1 | 3/2020 | Baek | |
| 2020/0295366 A1 | 9/2020 | Masahara et al. | |
| 2022/0255066 A1* | 8/2022 | Pan | H01M 10/0525 |

FOREIGN PATENT DOCUMENTS

| | | |
|---|---|---|
| CN | 1650450 A | 8/2005 |
| CN | 102171863 A | 8/2011 |
| CN | 102714291 A | 10/2012 |
| CN | 104009204 A | 8/2014 |
| CN | 105098193 A | 11/2015 |
| CN | 108886146 A | 11/2018 |
| CN | 109273688 A | 1/2019 |
| CN | 110148711 A | 8/2019 |
| CN | 110383542 A | 10/2019 |
| CN | 110582875 A | 12/2019 |
| CN | 110707285 A | 1/2020 |
| JP | WO2015/199168 A1 | 4/2017 |
| KR | 2016-0050835 A | 5/2016 |
| KR | 2019-0068484 A | 6/2019 |

OTHER PUBLICATIONS

PCT International Search Report mailed Nov. 20, 2020 in counterpart PCT application PCT/CN2020/075871, 5 pages in Chinese.
PCT Written Opinion mailed Nov. 20, 2020 in counterpart PCT application PCT/CN2020/075871, 4 pages in Chinese.
International Search Report and Written Opinion mailed on Nov. 18, 2020, in corresponding PCT/CN2020/076112, 13 pages.

* cited by examiner

*Primary Examiner* — Muhammad S Siddiquee
(74) *Attorney, Agent, or Firm* — XSENSUS LLP (57) ABSTRACT

A cathode material includes a lithium composite oxide matrix including lithium (Li) and at least one selected from the group consisting of cobalt (Co), nickel (Ni), manganese (Mn), and aluminium (Al), and has a surface layer which is a rocksalt structure and includes tungsten (W); and a material layer formed on the surface layer of the lithium composite oxide matrix and including tungsten (W) and lithium (Li). The cathode material of the present application provides excellent high-temperature cycle and high-temperature storage performance, and the capability of discharge at a high rate, and improves the safety performance of the electrochemical device.

16 Claims, 2 Drawing Sheets

CATHODE MATERIAL AND ELECTROCHEMICAL DEVICE INCLUDING THE SAME

CROSS REFERENCE TO RELATED APPLICATIONS

The present application is a National Stage application of PCT international application: PCT/CN2020/076112 filed on 21 Feb. 2020, the disclosure of which is hereby incorporated by reference in its entirety.

BACKGROUND

1. Technical Field

The present application relates to the technical field of energy storage, and particularly to a cathode material, and an electrochemical device including the same.

2. Description of the Related Art

With the popularization of consumer electronic products such as notebook computers, mobile phones, hand-held game consoles, tablet computers, mobile power supplies, and unmanned aerial vehicles, the requirements for electrochemical devices (e.g., batteries) used therein have become increasingly strict. For example, the batteries are not only required to be lightweight, but also should have high capacity and a long working life. Among the numerous types of batteries, lithium-ion batteries have dominated the market due to their outstanding advantages such as high energy density, high safety, low self-discharge, no memory effect, long working life and the like. Cathode material is one of the most critical materials in lithium-ion batteries. At present, developing cathode materials with high energy density, ultra-high rate, and long cycling life is of great interest of study in the field of lithium-ion batteries.

SUMMARY

One objective of the present application is to solve the following problems which exist during high-temperature cycling and high-temperature storage of lithium composite oxides in the prior art: the surface structure is prone to damage, the capacity retention rate decreases, and gas generation occurs at high temperature. In particular, these problems are even worse at high rate. In the present application, the structure and composition of the lithium composite oxide are modified to obtain excellent high-temperature cycle performance, high-temperature storage performance, the capability of discharge at high rate, and improved safety performance.

To solve the above problems, the present application provides a cathode material, which includes a lithium composite oxide matrix including lithium (Li), and at least one selected from the group consisting of cobalt (Co), nickel (Ni), manganese (Mn), and aluminium (Al); and the lithium composite oxide matrix has a surface layer including tungsten (W), wherein the surface layer has a rocksalt structure; and a material layer including tungsten (W) and lithium (Li) formed on the surface layer of the lithium composite oxide matrix.

In the cathode material of the present application, a content of tungsten (W) in the lithium composite oxide matrix decreases gradually from the surface layer toward the inside of the lithium composite oxide matrix.

In the cathode material of the present application, the lithium composite oxide matrix includes at least one material having the chemical formula $LiNi_pCo_yM_{1-p-y-z}M'_zO_2$, wherein the M element is manganese (Mn) or aluminium (Al), the M' element is at least one selected from tungsten (W), magnesium (Mg), aluminium (Al), titanium (Ti), zirconium (Zr), lanthanum (La), yttrium (Y), strontium (Sr), or cerium (Ce), wherein $0.5 \leq p < 1$, $0 \leq y < 0.5$, $0 < z \leq 0.01$, and $1-p-y-z$ is greater than zero.

In some embodiments, the material layer includes at least one compound having the chemical formula $Li_xWO_3$, wherein $0 < x < 1$.

In some embodiments, the material layer has an average thickness of 1 nm to 10 nm.

In the cathode material of the present application, based on a total weight of the cathode material, the content of tungsten (W) by weight is from 0.05 to 0.5%.

In some embodiments, the cathode material includes secondary particles. The cathode material has a particle size ranging from 6 μm to 15 μm from a small particle size side to a cumulative volume of 50% in a volume-based particle size distribution.

According to the present application, the cathode material has a residual lithium content of 1700 ppm or less on a surface of the cathode material.

The present application also provides an electrochemical device including the cathode material as described herein. In the electrochemical device according to the present application, a difference between a first I(003)/I(104) value of the cathode material after 100 cycles and a second I(003)/I(104) value of the cathode material before 100 cycles is 0.2 or less; wherein I(003) is the intensity of the cathode material in the (003) plane of the X-ray diffraction pattern, and I(104) is the intensity of the cathode material in the (104) plane of the X-ray diffraction pattern.

The cathode material provided in the present application can effectively improve the high-temperature cycle performance and high-temperature storage performance, and in the meantime the rate performance is also balanced. The electrochemical device utilizing the cathode material of the present application has excellent high-temperature cycle and high-temperature storage performance, as well as a capability of discharge at a high rate.

Additional aspects and advantages of the present application will be described or shown in the following description or illustrated by implementing the embodiments of the present application.

BRIEF DESCRIPTION OF THE DRAWINGS

The following will briefly illustrate the accompanying drawings, which are necessary to describe the embodiments of the present application or the prior art, so as to facilitate depicting the embodiments of the present application. Obviously, the accompanying drawings described below only show some embodiments of the present application. For those skilled in the art, the drawings of other embodiments can still be obtained according to the structures illustrated in the drawings.

DETAILED DESCRIPTION

Embodiments of the present application will be described in detail below. Throughout the specification, the same or similar components and components having the same or similar functions are denoted by similar reference numerals. The embodiments described herein with respect to the drawings are illustrative and graphical, and are used for providing a basic understanding of the present application. The embodiments of the present application should not be interpreted as limitations to the present application.

As used in the present application, terms "approximately", "substantially", "essentially", and "about" are used for describing and explaining a small variation. When being used in combination with an event or circumstance, the term may refer to an example wherein the event or circumstance occurs precisely, and an example wherein the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the value (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), it could be considered that the two values are "substantially" the same.

In the present application, unless otherwise particularly indicated or limited, relativistic wordings such as "central", "longitudinal", "lateral", "front", "back", "right", "left", "inner", "outer", "relatively low", "relatively high", "horizontal", "vertical", "higher than", "lower than", "above", "below", "top", "bottom", and their derived wordings (such as "horizontally", "downward", and "upward") should be construed as referenced directions described in discussion or shown in the appended drawings. These relativistic wordings are merely used for ease of description, and do not require constructing or operating the present application in a specific direction.

Further, to facilitate description, "first", "second", "third", and the like may be used in the present application to distinguish among different components in a figure or a series of figures. The wordings "first", "second", "third", and the like are not intended to describe corresponding components.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or subranges within the ranges, like explicitly specifying each value and each sub-range.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

I. Cathode Material

The cathode material of the present application includes a lithium composite oxide matrix including lithium (Li), and at least one selected from the group consisting of cobalt (Co), nickel (Ni), manganese (Mn), and aluminium (Al); and the lithium composite oxide matrix has a surface layer including tungsten (W), wherein the surface layer has a rocksalt structure; and a material layer including tungsten (W) and lithium (Li) formed on the surface layer of the lithium composite oxide matrix.

In some embodiments, the lithium composite oxide matrix includes lithium (Li), cobalt (Co), nickel (Ni), manganese (Mn) and/or aluminium (Al).

In some embodiments, the lithium composite oxide matrix includes at least one material having the chemical formula $LiNi_pCo_yM_{1-p-y-z}M'_zO_2$, wherein the M element is manganese (Mn) or aluminium (Al), the M' element is at least one selected from of tungsten (W), magnesium (Mg), aluminium (Al), titanium (Ti), zirconium (Zr), lanthanum (La), yttrium (Y), strontium (Sr), or cerium (Ce), wherein $0.5 \leq p < 1$, $0 \leq y < 0.5$, $0 < z \leq 0.01$, and $1-p-y-z$ is greater than zero.

In some embodiments, the M element is manganese (Mn), and M' is any of aluminium (Al), magnesium (Mg) or zirconium (Zr). In some embodiments, the M element is aluminium (Al), and the M' element is any of magnesium (Mg), zirconium (Zr) or yttrium (Y). In some embodiments, the M element is manganese (Mn) or aluminium (Al), and M' is any of titanium (Ti), lanthanum (La), yttrium (Y), strontium (Sr) or cerium (Ce).

In some embodiments, the material layer of the cathode material includes at least one compound having the chemical formula $Li_xWO_3$, wherein $0 < x < 1$, for example, x is about 0.9, about 0.8, about 0.6, about 0.5, or about 0.4.

In some embodiments, the lithium composite oxide matrix contained in the cathode material of the present application has an inner portion of a layered structure (for example, lithium nickel cobalt manganese oxide for the layered structure or lithium nickel cobalt aluminium oxide for the layered structure), and a surface layer of the rocksalt structure doped with the tungsten (W) element; and the material layer is of a compound having the chemical formula $Li_xWO_3$, wherein $0 < x < 1$.

In some embodiments, the cathode material of the present application has a material layer including lithium tungsten bronze compound, and the surface layer of the lithium composite oxide matrix has a rocksalt structure and includes tungsten (W); wherein the lithium composite oxide of the rocksalt structure in the surface layer has a better structural stability than the lithium composite oxide of layered structure inside the lithium composite oxide matrix, and is capable of effectively inhibiting the oxygen release from and the damage of the layered structure inside the lithium composite oxide matrix. The material layer (for example, lithium tungsten bronze $Li_xWO_3$) of the cathode material can reduce the residual content of lithium (Li) on the surface of the lithium composite oxide matrix, prevent side reactions of the lithium composite oxide matrix with the electrolyte, and serve as a good ion conductor that contributes to further improve the surface lithium (Li) ion transport. Thereby, lithium-ion batteries using such cathode material have excellent high-temperature cycle and high-temperature storage performance, and also the capability of discharge at a high rate.

In some embodiments, the content of residual lithium on a surface of the cathode material is determined by acid-base titration. Specifically, the lithium carbonate and lithium hydroxide in the cathode material are titrated with a standard solution of hydrochloric acid, and the end point is determined by a jump resulting from electric potential change by using a pH electrode as an indicator electrode. The content of residual lithium on a surface of the cathode material in the present application is 1700 ppm or less, for example, about 1500 ppm or less, about 1300 ppm or less, about 1200 ppm or less, about 1100 ppm or less, or about 1000 ppm or less, or any ranges therebetween.

In some embodiments, the average thickness of the surface layer of the lithium composite oxide matrix is from 1 nm to 10 nm, for example, about 1 nm, about 2 nm, about 3 nm, about 4 nm, about 5 nm, about 6 nm, about 7 nm, about 8 nm, about 9 nm, about 10 nm, or any ranges therebetween. The surface layer having an average thickness in the above range can provide effective electron and ion transport, and improve the rate performance and effective capacity per gram.

In some embodiments, the average thickness of the material layer of the lithium composite oxide matrix is from 1 nm to 10 nm, for example, about 1 nm, about 2 nm, about 3 nm, about 4 nm, about 5 nm, about 6 nm, about 7 nm, about 8 nm, about 9 nm, about 10 nm, or any ranges therebetween. The material layer having an average thickness in the above range is more conducive to the effective capacity of the cathode material.

In some embodiments, a content of tungsten (W) in the lithium composite oxide matrix decreases gradually from the surface layer toward the inside of the lithium composite oxide matrix.

In other embodiments, a content of tungsten (W) in the lithium composite oxide matrix remains substantially unchanged from the surface layer to the inside of the lithium composite oxide matrix. The tungsten element gradually decreasing from the surface layer to the inside can balance the rate performance and structural stability better. This is because the surface layer is more susceptible to erosion of the electrolyte and is unstable, and a higher content of tungsten can improve the stability of the surface material. The interior is relatively less susceptible to damage, and thus the content of tungsten element can be reduced.

In some embodiments, based on a total weight of the cathode material, the content of tungsten (W) by weight is from 0.05 to 0.5%. For example, based on the total weight of the cathode material, the content of tungsten (W) by weight is about 0.05%, about 0.1%, about 0.2%, about 0.3%, about 0.4%, about 0.5%, or any ranges therebetween.

In some embodiments, the cathode material includes primary particles formed of secondary particles. In the volume-based particle size distribution, the cathode material has a particle size ranging from 6 μm to 15 μm from a small particle size side to a cumulative volume of 50%. That is, the particle size distribution of the cathode material meets 6 μm≤Dv50≤15 μm. The use of secondary particles enables the cathode material of the present application to obtain excellent rate performance.

The present application also relates to a method for preparing a cathode material, including:

(1) reacting a solution containing at least one of a nickel (Ni) source, a cobalt (Co) source, an M' doping element source, a manganese (Mn) source, and an aluminum (Al) source according to the stoichiometry of the cathode material, with a sodium hydroxide (NaOH) solution and aqueous ammonia ($NH_3 \cdot H_2O$), to obtain a lithium composite oxide precursor, wherein the M' doping element is at least one selected from the group consisting of tungsten (W), magnesium (Mg), aluminium (Al), titanium (Ti), zirconium (Zr), lanthanum (La), yttrium (Y), strontium (Sr), and cerium (Ce);

(2) mixing the lithium composite oxide precursor with a lithium source and calcining under an oxygen atmosphere at 700° C. to 800° C. to obtain a lithium composite oxide; and (3) mixing the lithium composite oxide with a material including a tungsten (W) source and calcining under an oxygen atmosphere at 700 to 800° C.

In the method of the present application, a surface layer containing lithium and tungsten is formed during Step (3). In some embodiments, a surface layer containing lithium and tungsten and a material layer containing tungsten are formed during Step (3).

In some embodiments, the method for preparing a cathode material includes: (1) formulating a mixed solution including nickel sulfate ($NiSO_4$), cobalt sulfate ($CoSO_4$), manganese sulfate/aluminium sulfate ($MnSO_4/Al_2(SO_4)_3$), and a salt of M' metal, mixing and reacting the solution with a sodium hydroxide (NaOH) solution as a precipitant, and aqueous ammonia ($NH_3 \cdot H_2O$) as a complexing agent, to obtain a M' doped lithium nickel cobalt manganese/aluminium oxide precursor; (2) mixing the lithium nickel cobalt manganese/aluminium oxide precursor obtained in Step (1) uniformly with a lithium source by grinding, and calcining for 10 to 12 hrs under an oxygen atmosphere at 700 to 800° C., to obtain a ternary material of M' element doped lithium nickel cobalt manganese/aluminium oxide; and (3) mixing the lithium nickel cobalt manganese/aluminium oxide material obtained in Step (2) with $WO_3$ by grinding, and then calcining for 6 to 12 hrs under an oxygen atmosphere at 700 to 800° C., to obtain the cathode material of lithium nickel cobalt manganese oxide according to the present application. In Step (3), the amount of $WO_3$ is adjusted such that tungsten (W) is present in the cathode material of about 0.05% to about 0.5% by weight.

The lithium composite oxide matrix is doped through the above method, resulting in that the surface layer of the lithium composite oxide matrix has a more stable rocksalt structure, and thereby the stability of the surface layer of the lithium composite oxide matrix is substantially improved. Meanwhile, a material layer including lithium tungsten bronze $Li_xWO_3$ is formed on the surface layer of the lithium composite oxide matrix, and thus the content of residual lithium (Li) on the surface of the cathode material (for example, a high-nickel material) is reduced, side reactions of the matrix with the electrolyte are prevented, and the rate performance is improved.

II. Electrochemical Device

An electrochemical device according to the present application includes a cathode, an anode, a separator, and an electrolyte, wherein the cathode includes the cathode material as described above in the present application, and the anode includes an anode active material.

The electrochemical device of the present application includes any device wherein an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery. In some embodiments, the electrochemical device is a lithium ion battery.

In the electrochemical device according to the present application, a difference between a first I(003)/I(104) value of the cathode material after 100 cycles and a second I(003)/I(104) value of the cathode material before 100 cycles is 0.2 or less; wherein, I(003) is the intensity of the cathode material in the (003) plane of the X-ray diffraction pattern, and I(104) is the intensity of the cathode material in the (104) plane of the X-ray diffraction pattern. The change of the I(003)/I(104) value before and after 100 cycles indicates the increase extent for cation mixing. In the present application, the difference between the first and the second I(003)/I(104) value before and after 100 cycles is controlled at 0.2 or below, so as to obtain advantageous structural stability and cycle performance.

Figure 1:
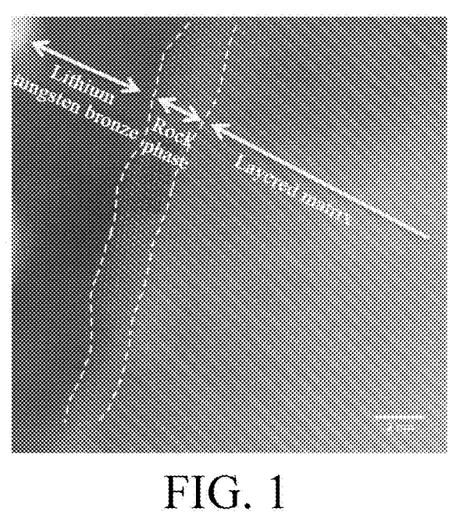
FIG. 1 shows an HRTEM (high-resolution transmission electron microscopy) image of a cathode material of lithium nickel cobalt manganese oxide according to the present application.
Figure 2:
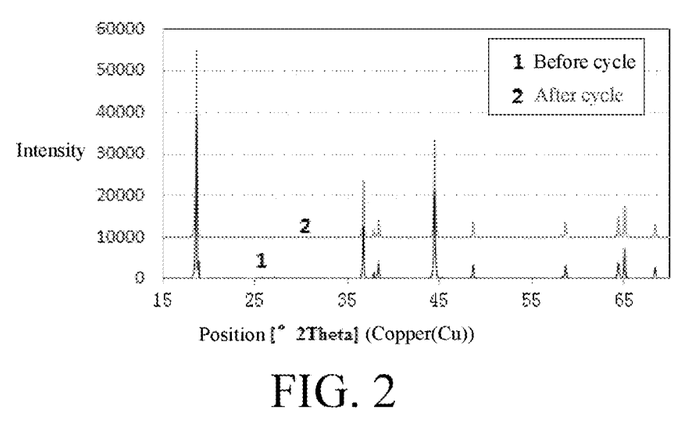
FIG. 2 shows an X-ray diffraction (XRD) pattern of a cathode material of lithium nickel cobalt manganese oxide according to Example 1 of the present application before and after 100 cycles after the cathode is fully discharged (to 2.8V), as well as corresponding changes of I(003)/I(104).

A cathode that is fully discharged is tested by XRD to obtain a ratio of I(003) to I(004), which is recorded as I1(003)/I1(004) (i.e., the first I(003)/I (104) value). The cathode is made into a battery and cycled 100 times with rate of 0.5C/0.5C at 25° C. Then, the cathode after 100 cycles is fully discharged, and tested by XRD again, to obtain a I(003)/I(004) ratio, which is recorded as I2(003)/I2(004) (i.e., the second I(003)/I (104) value). The absolute value of the difference between I2(003)/I2(004) and I1(003)/I1(004) is the change of the I(003)/I(104) value. As illustrated in FIG. 2, before 100 cycles, the I1(003)/I1(004) value is 1.41, and after 100 cycles, the I1(003)/I1(004) value is 1.49, so the change of the I(003)/I(104) value is 0.08.

In the electrochemical device according to the present application, the specific types of the anode active material, the separator, and the electrolyte are not particularly limited, and can be selected as needed.

Specifically, the anode active material useful in the present application is one or more selected from the group consisting of natural graphite, artificial graphite, mesocarbon microbead (MCMB), hard carbon, soft carbon, silicon, silicon-carbon composite, lithium-tin (Li—Sn) alloy, lithium-tin-oxygen (Li—Sn—O) alloy, tin (Sn), stannous oxide (SnO), stannic oxide ($SnO_2$), lithiated $TiO_2$—$Li_4Ti_5O_{12}$ having spinel structure, metal lithium (Li) and (Li—Al) alloy. The silicon-carbon composite indicates that at least about 5 wt % of silicon is contained based on the weight of the silicon-carbon anode active material.

The separator includes at least one selected from the group consisting of polyethylene, polypropylene, polyethylene terephthalate, polyimide or aramid. For example, polyethylene includes at least one selected from the group consisting of high-density polyethylene, low-density polyethylene, and ultrahigh molecular weight polyethylene. Particularly, polyethylene and polypropylene have a good effect on preventing short circuit, and can improve the stability of the battery through the shutdown effect.

The separator may further include a porous layer on the surface, and the porous layer is disposed on at least one surface of the separator. The porous layer includes inorganic particles and a binder. The inorganic particles are selected from the group consisting of alumina ($Al_2O_3$), silica ($SiO_2$), magnesia (MgO), titania ($TiO_2$), hafnium dioxide ($HfO_2$), stannic oxide ($SnO_2$), cerium dioxide ($CeO_2$), nickel oxide (NiO), zinc oxide (ZnO), calcium oxide (CaO), zirconia ($ZrO_2$), yttria ($Y_2O_3$), silicon carbide (SiC), eboehmite, aluminum hydroxide, magnesium hydroxide, calcium hydroxide and barium sulfate, or a combination of more than one thereof. The binder is one selected from the group consisting of polyvinylidene fluoride, a copolymer of vinylidene fluoride-hexafluoropropylene, a polyamide, polyacrylonitrile, a polyacrylate ester, polyacrylic acid, a polyacrylate salt, carboxymethylcellulose sodium, polyvinylpyrrolidone, polyvinyl ether, polymethyl methacrylate, polytetrafluoroethylene, and polyhexafluoropropylene, or a combination of more than one thereof.

The porous layer on the surface of the separator can improve heat resistance, oxidation resistance and infiltration ability of the separator by the electrolyte, and enhance the adhesion between the separator and the electrodes.

The electrolyte used in the embodiments of the present application may be one or more of a gel electrolyte, a solid electrolyte, and an electrolyte solution, where the electrolyte solution contains a lithium salt and a nonaqueous solvent.

In some embodiments, the lithium salt is one or more selected from the group consisting of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, and lithium difluoroborate. For example, $LiPF_6$ is selected as the lithium salt, because it can give a high ionic conductivity and improve the cycle characteristics.

The nonaqueous solvent may be carbonate compounds, carboxylate compounds, ether compounds, other organic solvents or combinations thereof.

The carbonate compounds may be linear carbonate compound, cyclic carbonate compounds, fluorocarbonate compounds or combinations thereof.

Examples of other organic solvents include dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, and phosphate, or combinations thereof.

In some embodiments, the non-aqueous solvent is selected from the group consisting of ethylene carbonate, propylene carbonate, diethyl carbonate, dimethyl carbonate, ethyl methyl carbonate, methyl acetate, ethyl propionate, fluoroethylene carbonate and combinations thereof.

The use of the electrochemical device of the present application is not particularly limited and can be used for any applications known in the art. In an embodiment, the electrochemical device according to the present application is applicable to, without limitation, notebook computers, pen-input computers, mobile computers, e-book players, portable phones, portable fax machines, portable copiers, portable printers, headset stereo headphones, video recorders, LCD TVs, portable cleaners, portable CD players, minidisc players, transceivers, electronic notebooks, calculators, memory cards, portable recorders, radios, backup power supplies, motors, vehicles, motorcycles, power bicycles, bicycles, lighting apparatus, toys, game consoles, clocks, electric power tools, flashlights, cameras, large household batteries, and lithium ion capacitors, and the like.

EXAMPLES

The embodiments of the present application will be exemplified below in conjunction with examples. It should be understood that the examples are only intended to illustrate the present application and are not intended to limit the protection scope of the present application.

Preparation Method

1. Preparation of Cathode Material

Example 1

Step (1): Nickel sulfate ($NiSO_4$) as a nickel source, cobalt sulfate ($CoSO_4$) as a cobalt source, manganese sulfate (MnSO$_4$) as a manganese source, and zirconium sulfate (Zr(SO$_4$)$_2$) as a zirconium source were formulated at a molar ratio of 0.83:0.12:0.046:0.004 to give a mixed solution of about 3 mol/L. Sodium hydroxide as a precipitant was formulated into an about 3 mol/L sodium hydroxide (NaOH) solution. Aqueous ammonia (NH$_3$·H$_2$O) as a complexing agent was formulated into about 2 mol/L aqueous ammonia (NH$_3$·H$_2$O). The mixed solution, the precipitant solution, and the complexing agent solution as formulated were simultaneously added into a reactor by constant-flow pumps.

The addition of the precipitant solution and the complexing agent solution was stopped at the end of the dropwise addition. The solution was controlled at a pH of about 11.5, under the reactor temperature of about 50° C., and with the stirring speed of 600 rpm. Subsequently, the solution was subjected to suction filtration, water wash and drying to produce a zirconium (Zr) doped lithium nickel cobalt manganese oxide precursor with a Dv50 of about 10 μm (wherein the molar proportion of the doping element of zirconium (Zr) is about 0.40%, and said molar proportion refers to the percentage of the moles of the zirconium (Zr) atoms participating in the reaction relative to the total moles of the nickel (Ni), cobalt (Co), manganese (Mn), and zirconium (Zr) atoms participating in the reaction).

Step (2): The zirconium (Zr)-doped lithium nickel cobalt manganese oxide precursor obtained in Step (1) and lithium hydroxide were mixed at a molar ratio of about 1:1.02 and ball milled for about 12 hrs, and calcined for 10 hrs under an oxygen atmosphere at about 750° C., to obtain a zirconium (Zr) element doped lithium nickel cobalt manganese oxide material, which was controlled by the sintering temperature to have a morphology of secondary particles formed with primary particles.

Step (3): The zirconium (Zr)-doped lithium nickel cobalt manganese oxide material obtained in Step (2) was mixed with a WO$_3$ powder by grinding. The amount of the WO$_3$ powder was controlled such that the content of the tungsten (W) element by weight percent in the final product was about 0.20%. Then the mixture was calcined for 12 hrs under an oxygen atmosphere at about 700° C. to obtain a lithium nickel cobalt manganese oxide cathode material having a surface layer with a rocksalt structure and a material layer of lithium tungsten bronze, wherein tungsten element was doped within the surface layer. The Dv50 of the cathode material is about 10 μm. The residual lithium on the surface was consumed by the formation of the surface layer and the material layer, resulting in a final residual lithium content of about 1300 ppm on the obtained cathode material (the testing method is shown hereafter).

Example 2

Step (1): Nickel sulfate (NiSO$_4$) as a nickel source, cobalt sulfate (CoSO$_4$) as a cobalt source, manganese sulfate (MnSO$_4$) as a manganese source, and zirconium sulfate (Zr(SO$_4$)$_2$) as a zirconium source were formulated at a molar ratio of 0.5:0.2:0.296:0.004 to give a mixed solution of about 3 mol/L. Sodium hydroxide as a precipitant was formulated into an about 3 mol/L sodium hydroxide (NaOH) solution. Aqueous ammonia (NH$_3$·H$_2$O) as a complexing agent was formulated into about 2 mol/L aqueous ammonia (NH$_3$·H$_2$O). The mixed solution, the precipitant solution, and the complexing agent solution as formulated were simultaneously added into a reactor by constant-flow pumps. The addition of the precipitant solution and the complexing agent solution was stopped at the end of the dropwise addition. The solution was controlled at a pH of about 10.5, under the reactor temperature of about 50° C., and with the stirring speed of 600 rpm. Subsequently, the solution was subjected to suction filtration, water wash and drying to produce a zirconium (Zr) doped lithium nickel cobalt manganese oxide precursor with a Dv50 of about 10 μm (wherein the molar proportion of the doping element of zirconium (Zr) is 0.40%, and said molar proportion refers to the percentage of the moles of the zirconium (Zr) atoms participating in the reaction relative to the total moles of the nickel (Ni), cobalt (Co), manganese (Mn), and zirconium (Zr) atoms participating in the reaction).

Step (2): The zirconium (Zr)-doped lithium nickel cobalt manganese oxide precursor obtained in Step (1) and lithium hydroxide were mixed at a molar ratio of about 1:1.02 and ball milled for about 12 hrs, and calcined for 10 hrs under an oxygen atmosphere at about 900° C., to obtain a zirconium (Zr) element doped lithium nickel cobalt manganese oxide material, which was controlled by the sintering temperature to have a morphology of secondary particles formed with primary particles.

Step (3): The lithium nickel cobalt manganese oxide material obtained in Step (2) was mixed with a WO$_3$ powder by grinding. The amount of the WO$_3$ powder was controlled such that the content of the tungsten (W) element by weight percent in the final product was about 0.20%. Then the mixture was calcined for 12 hrs under an oxygen atmosphere at about 700° C. to obtain a lithium nickel cobalt manganese oxide cathode material having a surface layer with a rocksalt structure and a material layer of lithium tungsten bronze, wherein the surface layer was doped with tungsten element. The Dv50 of the cathode material is about 10 μm. The cathode material has a low content of nickel (Ni), and the residual lithium on the surface was consumed by the formation of the surface layer and the material layer, resulting in a final residual lithium content of about 200 ppm on the obtained cathode material.

Example 3

The same method as that in Example 1 was adopted. Aluminium sulfate (Al$_2$(SO$_4$)$_3$) was used in place of manganese sulfate (MnSO$_4$). The nickel source, the cobalt source, the aluminium source, and the zirconium source at a molar ratio of 0.83:0.12:0.046:0.004 were prepared into a zirconium (Zr)-doped lithium nickel cobalt aluminium oxide precursor having a Dv50 of about 10 μm (wherein the molar proportion of the doping element zirconium (Zr) is about 0.40%, and said molar proportion refers to the percentage of the moles of the zirconium (Zr) atoms participating in the reaction relative to the total moles of the nickel (Ni), cobalt (Co), aluminium (Al), and zirconium (Zr) atoms participating in the reaction). By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 10 μm. The residual lithium content on the finally obtained cathode material is about 1300 ppm.

Example 4

The same method as that in Example 1 was adopted. Aluminium sulfate (Al$_2$(SO$_4$)$_3$) was used in place of zirconium sulfate (Zr(SO$_4$)$_2$). The nickel source, the cobalt source, the manganese source, and the aluminium source at a molar ratio of 0.83:0.12:0.046:0.004 were prepared into an aluminium (Al) doped lithium nickel cobalt manganese oxide precursor having a Dv50 of about 10 μm (wherein the molar proportion of the doping element of aluminium (Al) is about 0.40%, and said molar proportion refers to the percentage of the moles of the aluminium (Al) atoms participating in the reaction relative to the total moles of the nickel (Ni), cobalt (Co), manganese (Mn) and aluminium (Al) atoms participating in the reaction). By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 10 μm. The residual lithium content on the finally obtained cathode material is about 1300 ppm.

Example 5

The same method as that in Example 1 was adopted. Magnesium sulfate ($MgSO_4$) was used in place of zirconium sulfate ($Zr(SO_4)_2$). The nickel source, the cobalt source, the manganese source, and the magnesium source at a molar ratio of 0.83:0.12:0.046:0.004 were prepared into a magnesium (Mg)-doped lithium nickel cobalt manganese oxide precursor having a Dv50 of about 10 μm (wherein the molar proportion of the doping element of magnesium (Mg) is about 0.40%, and said molar proportion refers to the percentage of the moles of the magnesium (Mg) atoms participating in the reaction relative to the total moles of the nickel (Ni), cobalt (Co), manganese (Mn), and magnesium (Mg) atoms participating in the reaction). By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 10 μm. The residual lithium content on the finally obtained cathode material is about 1300 ppm.

Example 6

Step (1): Nickel sulfate ($NiSO_4$) as a nickel source, cobalt sulfate ($CoSO_4$) as a cobalt source, and manganese sulfate ($MnSO_4$) as a manganese source were formulated at a molar ratio of 0.83:0.12:0.05 to give a mixed solution of about 3 mol/L. Sodium hydroxide as a precipitant was formulated into an about 3 mol/L sodium hydroxide (NaOH) solution. Aqueous ammonia ($NH_3 \cdot H_2O$) as a complexing agent was formulated into about 2 mol/L aqueous ammonia ($NH_3 \cdot H_2O$). The mixed solution, the precipitant solution, and the complexing agent solution as formulated were simultaneously added into a reactor by constant-flow pumps. The addition of the precipitant solution and the complexing agent solution was stopped at the end of the dropwise addition. The solution was controlled at a pH of about 11.5, under the reactor temperature of about 50° C., and with the stirring speed of 600 rpm. Subsequently, the solution was subjected to suction filtration, water wash and drying to produce a lithium nickel cobalt manganese oxide precursor with a Dv50 of about 10 μm.

Step (2): The lithium nickel cobalt manganese oxide precursor obtained in Step (1) was mixed with a $TiO_2$ powder by grinding, and the mixing ratio was adjusted to control the molar proportion of the titanium (Ti) element as being about 0.40% (wherein the molar proportion of the doping element of titanium (Ti) is about 0.40%, and said molar proportion refers to the percentage of the moles of the titanium (Ti) atoms participating in the reaction relative to the total moles of the nickel (Ni), cobalt (Co), manganese (Mn) and titanium (Ti) atoms participating in the reaction.) Then, the resulted mixture and lithium hydroxide were mixed at a molar ratio of 1:1.02 and ball-milled for 12 hrs, and calcined under an oxygen atmosphere at about 750° C. for 10 hrs to obtain a titanium (Ti) element doped lithium nickel cobalt manganese oxide material, which was controlled by the sintering temperature to have a morphology of secondary particles formed with primary particles.

Step (3): The titanium (Ti)-doped lithium nickel cobalt manganese oxide material obtained in Step (2) was mixed with a $WO_3$ powder by grinding. The amount of the $WO_3$ powder was controlled such that the content of the tungsten (W) element by weight percent in the final product was about 0.20%. Then the mixture was calcined for 12 hrs under an oxygen atmosphere at about 700° C. to obtain a lithium nickel cobalt manganese oxide cathode material having a surface layer with a rocksalt structure and a material layer of lithium tungsten bronze, wherein the surface layer was doped with tungsten element. The Dv50 of the cathode material is about 10 μm. The residual lithium on the surface was consumed by the formation of the surface layer and the material layer, resulting in a final residual lithium content of about 1300 ppm on the obtained cathode material.

Example 7

The same method as that in Example 6 was adopted. Lanthanum oxide ($La_2O_3$) was used in place of titania ($TiO_2$). Lanthanum (La)-doped lithium nickel cobalt manganese oxide was synthesized through Steps (1) and (2). (The molar proportion of the doping element of lanthanum (La) is about 0.40%, and said molar proportion refers to the percentage of the moles of the lanthanum (La) atoms participating in the reaction relative to the total moles of the nickel (Ni), cobalt (Co), manganese (Mn), and lanthanum (La) atoms participating in the reaction.) By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 10 μm. The residual lithium content on the finally obtained cathode material is about 1300 ppm.

Example 8

The same method as that in Example 6 was adopted. Yttrium oxide ($Y_2O_3$) was used in place of titania ($TiO_2$). Yttrium (Y)-doped lithium nickel cobalt manganese oxide was synthesized through Steps (1) and (2). (The molar proportion of the doping element of yttrium (Y) is about 0.40%, and said molar proportion refers to the percentage of the moles of the yttrium (Y) atoms participating in the reaction relative to the total moles of the nickel (Ni), cobalt (Co), manganese (Mn), and yttrium (Y) atoms participating in the reaction.) By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 10 µm. The residual lithium content on the finally obtained cathode material is about 1300 ppm.

Example 9

The same method as that in Example 6 was adopted. Strontium oxide (SrO) was used in place of titania ($TiO_2$). Strontium (Sr)-doped lithium nickel cobalt manganese oxide was synthesized through Steps (1) and (2). (The molar proportion of the doping element of strontium (Sr) is about 0.40%, and said molar proportion refers to the percentage of the moles of the strontium (Sr) atoms participating in the reaction relative to the total moles of the nickel (Ni), cobalt (Co), manganese (Mn), and strontium (Sr) atoms participating in the reaction.) By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 10 µm. The residual lithium content on the finally obtained cathode material is about 1300 ppm.

Example 10

The same method as that in Example 6 was adopted. Cerium oxide ($CeO_2$) was used in place of titania ($TiO_2$). Cerium (Ce)-doped lithium nickel cobalt manganese oxide was synthesized through Steps (1) and (2). (The molar proportion of the doping element of cerium (Ce) is about 0.40%, and said molar proportion refers to the percentage of the moles of the cerium (Ce) atoms participating in the reaction relative to the total moles of the nickel (Ni), cobalt (Co), manganese (Mn), and cerium (Ce) atoms participating in the reaction.) By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 10 µm. The residual lithium content on the finally obtained cathode material is about 1300 ppm.

Example 11

The same method as that in Example 1 was adopted, except that no zirconium sulfate ($Zr(SO_4)_2$) was added. Nickel, cobalt, and manganese at a molar ratio of 0.83:0.12:0.05 were used to synthesize a lithium nickel cobalt manganese oxide precursor (without doping with the zirconium (Zr) element) having a Dv50 of about 10 µm. By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 10 µm. The residual lithium content on the finally obtained cathode material is about 1300 ppm.

Example 12

The same method as that in Example 1 was adopted. The nickel source, the cobalt source, the manganese source, and the zirconium source at a molar ratio of 0.83:0.12:0.04:0.01 were used to synthesize a zirconium (Zr)-doped lithium nickel cobalt manganese oxide precursor having a Dv50 of about 10 µm. (The molar proportion of the doping element of zirconium (Zr) is about 1.00%, and said molar proportion refers to the percentage of the moles of the zirconium (Zr) atoms participating in the reaction relative to the total moles of the nickel (Ni), cobalt (Co), manganese (Mn), and zirconium (Zr) atoms participating in the reaction.) By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 10 µm. The residual lithium content on the finally obtained cathode material is about 1300 ppm.

Example 13

The same method as that in Example 1 was adopted. The nickel source, the cobalt source, the manganese source, and the zirconium source at a molar ratio of 0.83:0.12:0.046:0.004 were used to synthesize a zirconium (Zr)-doped lithium nickel cobalt manganese oxide precursor having a Dv50 of about 10 µm. (The molar proportion of the doping element of zirconium (Zr) is about 0.40%, and said molar proportion refers to the percentage of the moles of the zirconium (Zr) atoms participating in the reaction relative to the total moles of the nickel (Ni), cobalt (Co), manganese (Mn), and zirconium (Zr) atoms participating in the reaction.) By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.05%, and the Dv50 of the cathode material is about 10 µm. The residual lithium content on the finally obtained cathode material is about 1700 ppm.

Example 14

The same method as that in Example 1 was adopted. The nickel source, the cobalt source, the manganese source, and the zirconium source at a molar ratio of 0.83:0.12:0.046:0.004 were used to synthesize a zirconium (Zr)-doped lithium nickel cobalt manganese oxide precursor having a Dv50 of about 10 µm. (The molar proportion of the doping element of zirconium (Zr) is about 0.40%, and said molar proportion refers to the percentage of the moles of the zirconium (Zr) atoms participating in the reaction relative to the total moles of the nickel (Ni), cobalt (Co), manganese (Mn), and zirconium (Zr) atoms participating in the reaction.) By a single sintering process, the morphology of the particles was controlled to be of secondary particles, and a surface layer with a rocksalt structure and a material layer of lithium tungsten bronze were formed. The content of the tungsten (W) element by weight percent in the finished product is about 0.50%, and the Dv50 of the cathode material is about 10 µm. The residual lithium content on the finally obtained cathode material is about 1000 ppm.

Example 15

The same method as that in Example 1 was adopted. A nickel source, a cobalt source, a manganese source, and a zirconium source at a molar ratio of 0.83:0.12:0.046:0.004 were used to synthesize a zirconium (Zr)-doped lithium nickel cobalt manganese oxide precursor having a Dv50 of about 6 μm. (The molar proportion of the doping element of zirconium (Zr) is about 0.40%, and said molar proportion refers to percentage of the moles of the zirconium (Zr) atoms participating in the reaction relative to the total moles of the nickel (Ni), cobalt (Co), manganese (Mn), and zirconium (Zr) atoms participating in the reaction.) By a single-sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 6 μm. The residual lithium content on the finally obtained cathode material is about 1400 ppm.

Example 16

The same method as that in Example 1 was adopted. The nickel source, the cobalt source, the manganese source, and the zirconium source at a molar ratio of 0.83:0.12:0.046: 0.004 were used to synthesize a zirconium (Zr)-doped lithium nickel cobalt manganese oxide precursor having a Dv50 of about 8 μm. (The molar proportion of the doping element of zirconium (Zr) is about 0.40%, and said molar proportion refers to percentage of the moles of the zirconium (Zr) atoms participating in the reaction relative to the total moles of the nickel (Ni), cobalt (Co), manganese (Mn), and zirconium (Zr) atoms participating in the reaction.) By a single-sintering process, the morphology of the particles was controlled to be of secondary particles, and a surface layer with a rocksalt structure and a material layer of lithium tungsten bronze were formed. The content of the tungsten (W) element by weight percent in the finished product is about 0.20%, and the Dv50 of the cathode material is about 15 μm. The residual lithium content on the finally obtained cathode material is about 1300 ppm.

Comparative Example 1

The same method as that in Example 1 was adopted. An undoped and uncoated nickel-cobalt-manganese ternary cathode material was prepared, wherein Ni:Co:Mn=0.83: 0.12:0.05 (in molar ratio). By using the same sintering process, the morphology of the material was controlled to be of secondary particles formed with primary particles, and the Dv50 is about 10 μm. The residual lithium content on the finally obtained cathode material is about 1800 ppm.

Comparative Example 2

The same method as that in Example 1 was adopted. An undoped and uncoated nickel-cobalt-manganese ternary cathode material was prepared, wherein Ni:Co:Mn=0.83: 0.12:0.05 (in molar ratio). By adjusting the sintering temperature in Step (2), the morphology of particles was controlled to be of primary particles, and the Dv50 is about 10 μm. The residual lithium content on the finally obtained cathode material is about 800 ppm.

Comparative Example 3

The same method as that in Example 2 was adopted. An undoped and uncoated nickel-cobalt-manganese ternary cathode material was synthesized, wherein Ni:Co:Mn=0.5: 0.2:0.3 (in molar ratio). By adjusting the sintering temperature in Step (2), the morphology of particles was controlled to be of primary particles, and the Dv50 is about 10 μm. The residual lithium content on the finally obtained cathode material is about 300 ppm.

Table 1 below lists the parameters of the cathode material prepared in the above examples and comparative examples:

TABLE 1

| | Cathode materials prepared in Examples and Comparative Examples | | | | | | |
|---|---|---|---|---|---|---|---|
| | Lithium composite oxide ($LiNi_pCo_yM_{1-p-y-z}M'_zO_2$) | | | | Content of | | |
| No. | Nickel (Ni):cobalt (Co) | M element | M' element | Content of M' element (mol %) | tungsten (W) element (wt %) | Morphology | Dv50 |
| Example 1 | 0.83:0.12 | Mn | Zr | 0.40 | 0.20 | Secondary particles | 10 |
| Example 2 | 0.5:0.2 | Mn | Zr | 0.40 | 0.20 | Secondary particles | 10 |
| Example 3 | 0.83:0.12 | Al | Zr | 0.40 | 0.20 | Secondary particles | 10 |
| Example 4 | 0.83:0.12 | Mn | Al | 0.40 | 0.20 | Secondary particles | 10 |
| Example 5 | 0.83:0.12 | Mn | Mg | 0.40 | 0.20 | Secondary particles | 10 |
| Example 6 | 0.83:0.12 | Mn | Ti | 0.40 | 0.20 | Secondary particles | 10 |
| Example 7 | 0.83:0.12 | Mn | La | 0.40 | 0.20 | Secondary particles | 10 |
| Example 8 | 0.83:0.12 | Mn | Y | 0.40 | 0.20 | Secondary particles | 10 |
| Example 9 | 0.83:0.12 | Mn | Sr | 0.40 | 0.20 | Secondary particles | 10 |
| Example 10 | 0.83:0.12 | Mn | Ce | 0.40 | 0.20 | Secondary particles | 10 |
| Example 11 | 0.83:0.12 | Mn | / | / | 0.20 | Secondary particles | 10 |
| Example 12 | 0.83:0.12 | Mn | Zr | 1.00 | 0.20 | Secondary particles | 10 |

TABLE 1-continued

Cathode materials prepared in Examples and Comparative Examples

| No. | Lithium composite oxide ($LiNi_pCo_yM_{1-p-y-z}M'_zO_2$) | | | | Content of tungsten (W) element (wt %) | Morphology | Dv50 |
|---|---|---|---|---|---|---|---|
| | Nickel (Ni):cobalt (Co) | M element | M' element | Content of M' element (mol %) | | | |
| Example 13 | 0.83:0.12 | Mn | Zr | 0.40 | 0.05 | Secondary particles | 10 |
| Example 14 | 0.83:0.12 | Mn | Zr | 0.40 | 0.50 | Secondary particles | 10 |
| Example 15 | 0.83:0.12 | Mn | Zr | 0.40 | 0.20 | Secondary particles | 6 |
| Example 16 | 0.83:0.12 | Mn | Zr | 0.40 | 0.20 | Secondary particles | 15 |
| Comparative Example 1 | 0.83:0.12 | Mn | / | / | / | Secondary particles | 10 |
| Comparative Example 2 | 0.83:0.12 | Mn | / | / | / | Primary particles | 10 |
| Comparative Example 3 | 0.5:0.2 | Mn | / | / | / | Secondary particles | 10 |

2. Preparation of Lithium-Ion Battery

The cathode material prepared in the above examples and comparative examples, acetylene black (as conductive agent), and polyvinylidene fluoride (as binder) were mixed uniformly at a weight ratio of 96:2:2. An appropriate amount of N-methylpyrrolidone was added and stirred fully to prepare a uniform slurry. The slurry was coated on an Al foil (current collector). The coated foil was dried, and cold-pressed to obtain a cathode.

The anode material of artificial graphite, acetylene black (as conductive agent), styrene-butadiene rubber (as binder), and sodium carboxymethyl cellulose (as thickener) were mixed uniformly at a weight ratio of 95:2:2:1. An appropriate amount of deionized water was added and stirred fully to prepare a uniform slurry. The slurry was coated on a Cu foil (current collector). The coated foil was dried, and cold-pressed to obtain an anode.

A polyethylene (PE) porous polymer film was used as the separator.

The cathode, the separator and the anode were laminated in order, and wound to obtain an electrode assembly. The electrode assembly was placed in an outer package, injected with an electrolyte, and encapsulated, to obtain a lithium-ion battery.

Test Methods

1. Test Method for Residual Lithium Content on Surface of Cathode Material

Basic principle: The lithium carbonate and lithium hydroxide in the cathode material were determined by acid-base titration with a standard solution of hydrochloric acid, and the end point was determined by a jump resulting from electric potential change by using a pH electrode as an indicator electrode.

Chemical Reaction Formula at First Equivalence Point:

$Li_2CO_3+HCl=LiCl+LiHCO_3$; $LiOH+HCl=LiCl+H_2O$

Chemical Reaction Formula at Second Equivalence Point:

$LiHCO_3+HCl=LiCl+H_2CO_3$

In the present application, a Titrando potentiometric titrator of 905 type was used, the electrode was a composite pH electrode, and the reagent was a standard solution of about 0.05 mol/L HCl. Sample pretreatment method: about 30 g (accurate to 0.01 g) of the sample was weighed into an about 250 ml iodine flask, and the weight was recorded in m(g). About 100 ml of pure water was added, and stirred for 30 minutes. The solution was suction filtered through an about 0.45 μm micropore filter membrane. About 25 ml of the filtrate was taken using a single-mark pipette rinsed with the filtrate and tested.

Calculation formula for residual lithium content: $C_1=10000 \times V_2 \times C_2 \times 6.94 \times N \times 100/(m \times 1000)$ wherein:

$C_1$ is the residual lithium content, in ppm;

m is the weight of the sample, in g;

$C_2$ is the concentration of the HCl standard solution, in mol/L;

6.94 is the molecular weight of lithium;

N is the multiple of the total filtrate relative to the filtrate taken; and $V_2$ is the volume corresponding to the second titration end-point, in mL.

(2) Performance Evaluation of Lithium Ion Battery 2.1. Capacity Test

Each of the 4 lithium-ion batteries prepared with the cathode materials in the examples and comparative examples were tested, and charged with constant current and constant voltage at an ambient temperature of about 25° C. at the charging current of 0.5C (that is, the current value at which the theoretical capacity is completely discharged within 2 hrs) until the upper limit voltage of about 4.2V was reached. Then the batteries were discharged at a constant current at the discharging current of 0.2C, until the final voltage was about 2.8V. The discharge capacity of the first cycle was calculated as the battery capacity.

2.2 Test of Cycle Performance and Gas Production after Cycling

Each of the 4 lithium-ion batteries prepared with the cathode materials in the examples and comparative examples were tested, and repeatedly charged and discharged according to the following steps. The discharge capacity retention rate of lithium-ion batteries was calculated.

The first charge and discharge were performed at an ambient temperature of about 45° C. The batteries were charged at a constant current and constant voltage at the charging constant of 2C, until the upper limit voltage of about 4.2V was reached. Then the batteries were discharged with constant current at the discharging current of 6C, until the final voltage was about 2.8V. The discharge capacity of the first cycle was recorded. Then, 500 cycles of charge and discharge were performed, and the discharge capacity of the 500$^{th}$ cycle was recorded.

Capacity retention rate after cycling=(Discharge capacity of the 500$^{th}$ cycle/Discharge capacity of the first cycle)×100%

Gas production after cycling: expansion rate of the thickness of lithium ion battery=((thickness after the 500$^{th}$ cycle−the initial thickness)/the initial thickness))×100%

2.3 High-Temperature Storage Performance Test

Each of the 4 lithium-ion batteries prepared with the cathode materials in the examples and comparative examples were tested, and charged at an ambient temperature of 45° C. at a constant current of 0.5C to a voltage higher than about 4.2V and to a current less than 0.05C at a constant voltage of about 4.2V, such that the batteries were in state of full charge of 4.2V. The thickness of the fully charged battery before storage was tested. The fully charged batteries were stored in an oven at about 85° C. for about 24 hrs, and then the thickness after storage was tested.

Thickness expansion rate=((thickness after storage at 85° C. for 24 hrs−the initial thickness)/the initial thickness after full charge)×100%.

The performance test results of the cathode materials prepared in the examples and comparative examples of the present application are shown in Table 2 below.

internal lithium composite oxide with layered structure and the damage thereof; the material layer of lithium tungsten bronze $Li_xWO_3$ can reduce the residual lithium on the surface of the cathode material, prevent side reactions between the lithium composite oxide matrix and the electrolyte to a certain extent, and improve the surface lithium ion transport. Furthermore, the morphological characteristics of the secondary particles have the advantage of large-rate discharge compared to primary particles.

Example 1 and Example 2 (with Varied Ratios of Nickel (Ni), Cobalt (Co), and Manganese (Mn))

Compared with Example 1, the ratio of nickel (Ni), cobalt (Co), and manganese (Mn) in the lithium nickel cobalt manganese oxide material is adjusted in Example 2. Based on the test results, it can be known that the material with a higher nickel (Ni) content (Example 1) has a high capacity per gram (about 202 mAh/g), and a better rate performance (as indicated by a discharge capacity retention rate at 10C of 90%). Through the modification by coating with lithium tungsten bronze $Li_xWO_3$, the residual lithium content on the surface and the performance at high temperatures are more substantially improved. The material with a lower nickel (Ni) content (Example 2) has better structural stability, which makes it more advantageous in high-temperature storage and high temperature cycle performance. Through the modification by coating with lithium tungsten bronze $Li_xWO_3$, the residual lithium (Li) content on the surface and the performance at high temperatures are improved to some degree.

| No. | Average thickness of $Li_xWO_3$ layer (nm) | Residual lithium content on surface (ppm) | Capacity of per gram of cathode (mAh/g) | Expansion rate after storage at 85° C. for 24 hrs, % | Discharge capacity retention rate at 10 C, % | Expansion rate after 500 cycles, % | Capacity retention rate after 500 cycles, % |
|---|---|---|---|---|---|---|---|
| Example 1 | 5 | 1300 | 202 | 20% | 90% | 8% | 80% |
| Example 2 | 5 | 200 | 160 | 10% | 87% | 6% | 90% |
| Example 3 | 5 | 1200 | 192 | 15% | 90% | 7% | 82% |
| Example 4 | 5 | 1300 | 201 | 18% | 90% | 8% | 82% |
| Example 5 | 5 | 1300 | 202 | 20% | 90% | 8% | 78% |
| Example 6 | 5 | 1300 | 202 | 20% | 91% | 8% | 80% |
| Example 7 | 5 | 1300 | 202 | 22% | 90% | 8% | 80% |
| Example 8 | 5 | 1300 | 202 | 21% | 90% | 8% | 78% |
| Example 9 | 5 | 1300 | 201 | 20% | 89% | 8% | 77% |
| Example 10 | 5 | 1300 | 201 | 22% | 90% | 8% | 78% |
| Example 11 | 5 | 1300 | 203 | 25% | 92% | 9% | 76% |
| Example 12 | 5 | 1300 | 196 | 15% | 86% | 7% | 85% |
| Example 13 | 1 | 1700 | 202 | 25% | 92% | 9% | 76% |
| Example 14 | 10 | 1000 | 200 | 15% | 92% | 7% | 85% |
| Example 15 | 5 | 1400 | 203 | 35% | 93% | 15% | 70% |
| Example 16 | 5 | 1300 | 201 | 15% | 88% | 7% | 82% |
| Comparative Example 1 | / | 1800 | 203 | 50% | 95% | 20% | 40% |
| Comparative Example 2 | / | 800 | 195 | 20% | Failed to discharge | Failed to discharge | Failed to discharge |
| Comparative Example 3 | / | 300 | 160 | 20% | 88% | 15% | 60% |

Example 1 and Comparative Examples 1-2

Compared with Comparative Examples 1-2, Example 1 has better overall results in terms of capacity, high-temperature storage performance, high-temperature cycle performance, and rate performance. This can be attributed to the fact that in the cathode material in Example 1, the lithium composite oxide matrix is more stable after being doped with zirconium (Zr); the surface layer with the rocksalt structure can effectively inhibit the oxygen release from the Examples 1, and 4-10

In Examples 1, and 4-10, various M′ elements (zirconium (Zr), aluminium (Al), magnesium (Mg)), titanium (Ti), lanthanum (La), yttrium (Y), strontium (Sr), and cerium (Ce)) are involved. Compared with Comparative Example 1, the test results show that doping with aluminium (Al), magnesium (Mg) titanium (Ti), lanthanum (La), yttrium (Y), strontium (Sr), and cerium (Ce) can also achieve a stable structure and bring about the effect of improving cycle performance.

Examples 1, 11, and 12 (with Varied Contents of the Doping Element of Zirconium (Zr))

In Examples 1, 11, and 12, the doping amounts of the zirconium (Zr) element in the bulk lithium nickel cobalt manganese oxide material are adjusted. It can be known from the test results that by increasing the content of the zirconium (Zr) element (increasing from 0% to 1%), the bulk structure is more stable, and the cycle and storage performance are improved. However, if the zirconium (Zr) content exceeds the range as specified herein, the capacity per gram will be significantly reduced, and the rate performance will be deteriorated.

Examples 1, 13, and 14 (with Varied Content the of Tungsten (W) Element)

In Examples 1, 13, and 14, the contents of the tungsten (W) element in the surface layer of the lithium nickel cobalt manganese oxide and the material layer are adjusted. It can be known from the test results that with an increase of the content of the tungsten (W) element (increasing from about 0.05% to about 0.5%), the average thickness of the material layer of $Li_xWO_3$ (0<x<1) is increased (increasing from about 1 nm to about 10 nm), and the consumption of residual lithium (Li) on the surface is increased, leading to a decrease in the total residual lithium on the material surface (reducing from about 1700 ppm to about 1000 ppm). Because $Li_xWO_3$ has better $Li^+$ transport performance, when the content of tungsten (W) is within the range as specified herein, significant deterioration of the capacity per gram can be avoided. Within the stated range, as the content of tungsten (W) increases, the high-temperature storage and high-temperature cycle performance and the rate performance are all improved to a certain extent.

Examples 1, 15 and 16 (with Varied Particle Sizes Dv50)

In Examples 1, 15 and 16, the particle size Dv50 of the lithium nickel cobalt manganese oxide material is adjusted. It can be known from the test results that as the Dv50 increases (increasing from about 6 μm to about 15 μm), the high-temperature storage and high-temperature cycle performance are improved. By changing the particle size, it is possible to balance the rate performance and performance at high temperatures.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. A cathode material, comprising:
    a lithium composite oxide matrix comprising lithium (Li), and at least one selected from the group consisting of cobalt (Co), nickel (Ni), manganese (Mn), and aluminium (Al); and the lithium composite oxide matrix has a surface layer comprising tungsten (W), wherein the surface layer has a rocksalt structure; and
    a material layer comprising tungsten (W) and lithium (Li) formed on the surface layer of the lithium composite oxide matrix,
    wherein the material layer comprises at least one compound having the chemical formula $Li_xWO_3$, wherein 0<x<1, and
    the cathode material has a residual lithium content of 1100 ppm or more and 1700 ppm or less on a surface of the cathode material.

2. The cathode material according to claim 1, wherein a content of tungsten (W) in the lithium composite oxide matrix decreases gradually from the surface layer toward the inside of the lithium composite oxide matrix.

3. The cathode material according to claim 1, wherein the lithium composite oxide matrix comprises at least one material having the chemical formula $LiNi_pCo_yM_{1-p-y-z}M'_zO_2$, wherein the M element is manganese (Mn) or aluminium (Al), the M' element is at least one selected from tungsten (W), magnesium (Mg), aluminium (Al) titanium (Ti), zirconium (Zr), lanthanum (La), yttrium (Y), strontium (Sr), or cerium (Ce), wherein 0.5≤p<1, 0≤y<0.5, 0<z≤0.01, and 1−p−y−z is greater than zero.

4. The cathode material according to claim 1, wherein the material layer has an average thickness of 1 nm to 10 nm.

5. The cathode material according to claim 1, wherein based on a total weight of the cathode material, the content of tungsten (W) by weight is from 0.05% to 0.5%.

6. The cathode material according to claim 1, wherein the cathode material comprises secondary particles; and the cathode material has a particle size ranging from 6 μm to 15 μm from a small particle size side to a cumulative volume of 50% in a volume-based particle size distribution.

7. The cathode material according to claim 1, wherein the cathode material has a residual lithium content of 1700 ppm or less on a surface of the cathode material.

8. An electrochemical device, comprising a cathode material, wherein the cathode material comprises:
    a lithium composite oxide matrix comprising lithium (Li), and at least one selected from the group consisting of cobalt (Co), nickel (Ni), manganese (Mn), and aluminium (Al); and the lithium composite oxide matrix has a surface layer comprising tungsten (W), wherein the surface layer has a rocksalt structure; and
    a material layer comprising tungsten (W) and lithium (Li) formed on the surface layer of the lithium composite oxide matrix,
    wherein the material layer comprises at least one compound, having the chemical formula $Li_xWO_3$, wherein 0<x<1, and
    the cathode material has a residual lithium content of 1100 ppm or more and 1700 ppm or less on a surface of the cathode material.

9. The electrochemical device according to claim 8, wherein a difference between a first I(003)/I(104) value of the cathode material after 100 cycles and a second I(003)/I(104) value of the cathode material before 100 cycles is 0.2 or less; wherein, I(003) is the intensity of the cathode material in the (003) plane of the X-ray diffraction pattern, and I(104) is the intensity of the cathode material in the (104) plane of the X-ray diffraction pattern.

10. The electrochemical device according to claim 8, wherein a content of tungsten (W) in the lithium composite oxide matrix decreasing gradually from the surface layer toward the inside of the lithium composite oxide matrix.

11. The electrochemical device according to claim 8, wherein the lithium composite oxide matrix of the cathode material comprises at least one material having the chemical formula $LiNi_pCo_yM_{1-p-y-z}M'_zO_2$, wherein the M element is manganese (Mn) or aluminium (Al), the M' element is at least one selected from tungsten (W), magnesium (Mg), aluminium (Al), titanium (Ti), zirconium (Zr), lanthanum (La), yttrium (Y), strontium (Sr), or cerium (Ce), wherein $0.5 \leq p < 1$, $0 \leq y < 0.5$, $0 < z \leq 0.01$, and $1-p-y-z$ is greater than zero.

12. The electrochemical device according to claim 8, wherein the material layer of the cathode material has an average thickness of 1 nm to 10 nm.

13. The electrochemical device according to claim 8, wherein the cathode material has a content of tungsten (W) by weight from 0.05% to 0.5% based on a total weight of the cathode material.

14. The electrochemical device according to claim 8, wherein the cathode material comprises secondary particles; and the cathode material has a particle size ranging from 6 μm to 15 μm from a small particle size side to a cumulative volume of 50% in a volume-based particle size distribution.

15. The electrochemical device according to claim 8, wherein the cathode material has a residual lithium content of 1700 ppm or less on a surface of the cathode material.

16. The cathode material according to claim 1, wherein the cathode material has the residual lithium content of 1200 ppm or more and 1700 ppm or less on the surface of the cathode material.

* * * * *